(12) United States Patent
Conrad et al.

(10) Patent No.: US 7,809,695 B2
(45) Date of Patent: Oct. 5, 2010

(54) INFORMATION RETRIEVAL SYSTEMS WITH DUPLICATE DOCUMENT DETECTION AND PRESENTATION FUNCTIONS

(75) Inventors: Jack G. Conrad, Eagan, MN (US); Joanne R. S. Claussen, Apple Valley, MN (US); Jie Lin, Shoreview, MN (US)

(73) Assignee: Thomson Reuters Global Resources, Baar (CH)

( * ) Notice: Subject to any disclaimer, the term of this patent is extended or adjusted under 35 U.S.C. 154(b) by 76 days.

(21) Appl. No.: 11/122,577

(22) Filed: May 5, 2005

(65) Prior Publication Data

US 2006/0041597 A1    Feb. 23, 2006

Related U.S. Application Data

(60) Provisional application No. 60/603,762, filed on Aug. 23, 2004, provisional application No. 60/623,975, filed on Nov. 1, 2004.

(51) Int. Cl.
*G06F 7/00* (2006.01)
(52) U.S. Cl. .................... 707/692; 707/729; 707/730
(58) Field of Classification Search ............. 707/200, 707/300, 100
See application file for complete search history.

(56) References Cited

U.S. PATENT DOCUMENTS

| | | | | |
|---|---|---|---|---|
| 5,488,725 | A * | 1/1996 | Turtle et al. ............... | 707/5 |
| 5,826,260 | A * | 10/1998 | Byrd et al. ............... | 707/5 |
| 5,913,208 | A * | 6/1999 | Brown et al. .............. | 707/3 |
| 6,138,113 | A * | 10/2000 | Dean et al. ............... | 707/2 |
| 6,654,739 | B1 | 11/2003 | Apte et al. | |
| 6,658,423 | B1 * | 12/2003 | Pugh et al. ............... | 707/102 |
| 6,757,675 | B2 * | 6/2004 | Aiken et al. ............... | 707/3 |

(Continued)

FOREIGN PATENT DOCUMENTS

EP    0513652 A2    11/1992

(Continued)

OTHER PUBLICATIONS

"International Search Report for corresponding PCT Application No. PCT/US2005/030024", (Dec. 16, 2005),4 pgs.

(Continued)

*Primary Examiner*—Pierre M Vital
*Assistant Examiner*—Augustine Obisesan
(74) *Attorney, Agent, or Firm*—Valenti, Hanley & Robinson, PLLC; Kevin T. Duncan

(57) ABSTRACT

Many companies provide online search facilities that enable users to conduct computerized searches for documents. Unfortunately, these searches frequently provide results that include duplicate documents—that is, documents that are completely or substantially identical to each other. This problem is particularly vexing when searching news stories, for example. Moreover, the duplicate documents are intermixed in the search results, leaving users to manually manage the complexities of identifying and/or filtering them. Accordingly, the present inventors devised systems, methods, and software that facilitate the identification and/or grouping of duplicate documents in search results. One exemplary system includes a signature generation module which generates document signatures based on length, temporal, and/or content components; a real-time duplicate detection module which uses the document signatures to identify "exact" or "fuzzy" duplicate documents; and a user-interface or presentation module which controls how duplicate documents are presented or suppressed in search results.

39 Claims, 9 Drawing Sheets

U.S. PATENT DOCUMENTS

| | | | |
|---|---|---|---|
| 6,785,669 B1 * | 8/2004 | Aggarwal et al. | 707/3 |
| 6,978,419 B1 * | 12/2005 | Kantrowitz | 715/511 |
| 7,013,310 B2 * | 3/2006 | Messing et al. | 707/104.1 |
| 7,139,756 B2 * | 11/2006 | Cooper et al. | 707/6 |
| 7,264,274 B2 * | 9/2007 | Ridgway et al. | 280/777 |
| 2002/0161788 A1 * | 10/2002 | McDonald | 707/203 |
| 2002/0174101 A1 * | 11/2002 | Fernley et al. | 707/1 |
| 2003/0172063 A1 | 9/2003 | Gutta et al. | |
| 2004/0093323 A1 * | 5/2004 | Bluhm et al. | 707/3 |
| 2005/0060643 A1 * | 3/2005 | Glass et al. | 715/501.1 |

FOREIGN PATENT DOCUMENTS

| | | |
|---|---|---|
| WO | WO-03075181 A2 | 9/2003 |
| WO | WO-2006/023941 A1 | 3/2006 |

OTHER PUBLICATIONS

"Secure Hash Standard", *Federal Information Processing Standards Publication 180-1*, U.S. Department of Commerce/National Institute of Standards and Technology, (Apr. 17, 1995), 18 pgs/.

Brin, S., et al., "Copy Detection Mechanisms for Digital Documents", *Proceedings of the Special Interest Group on Management of Data (SIGMOD '95)*, (May, 1995), 398-409.

Brin, S., et al., "The Anatomy of a Large-Scale Hypertextual Web Search Engine" *Proceedings of the Seventh International World Wide Web Conference (WWW7 '98)*, (Apr. 1998), 107-117.

Broder, A. Z., et al., "Syntactic Clustering of the Web", *Proceedings of the Sixth International World Wide Web Conference (WWW6 '97)*, (Apr. 1997), 1157-1166.

Burgin, R., "Variations in Relevance Judgments and the Evaluation of Retrieval Performance", *Information Processing and Management*, 26(5), (1992), 619-627.

Callan, J., et al., "Query-Based Sampling of Text", *ACM Transactions on Information Systems (TOIS)*, 19(2), (Apr. 2001), 97-130.

Carletta, J., "Assessing Agreement on Classification Tasks: The Kappa Statistic", *Computational Linguistics*, 22(2), (1996), 249-254.

Chowdhury, A., et al., "Collection Statistics for Fast Duplicate Document Detection", *ACM Transactions on Information Systems (TOIS)*, 20(2), (Apr. 2002), 171-191.

Cleverdon, C. D., "The Effect of Variations in Relevance Assessments in Comparative Experimental Tests of Index Languages", *Technical Report, Cranfield Library Report No. 3*, Cranfield Institute of Technology, Cranfield, UK, (Oct. 1970), 53 pgs.

Conrad, J. G., et al., "Constructing a Text Corpus for Inexact Duplicate Detection", *SIGIR '04*, Jul. 25-29, 2004; Sheffield, South Yorkshire, UK, (Jul. 2004), 2 pgs.

Conrad, J. G., et al., "Managing Déjà Vu: Collection Building for the Identification of Non-Identical Duplicate Documents", *CIKM '04*, Nov. 8-13, 2004; Washington, DC,(Nov. 2004),9 pgs/.

Conrad, J. G., et al., "Online Duplicate Document Detection: Signature Reliability in a Dynamic Retrieval Environment", *Proceedings of the 12th International Conference on Information and Knowledge Management (CIKM'03)*, (Nov. 2003), 443-452.

Cooper, J. W., et al., "Detecting Similar Documents Using Salient Terms", *Proceedings of the 11th International Conference on Information and Knowledge Management (CIKM '02)*, (Nov. 2002), 245-251.

Cormack, G. V., et al., "Efficient Construction of Large Test Collections", *Proceedings of the 21st International Conference on Research and Development in Information Retrieval (SIGIR '98)*, (Aug. 1998), 282-289.

Frieder, O., et al., "Efficiency Considerations for Scalable Information Retrieval Servers", *Journal of Digital Information*, 1(5), (Jan. 2000), 1-26.

Frieder, O., et al., "On Scalable Information Retrieval Systems", *Computer society, Proceedings of the Second IEEE International Symposium on Network Computing and Application (NCA'03)*, (Apr. 16, 2003), 241-245.

Harter, S. P., "Variations in Relevance Assessments and the Measurement of Retrieval Effectiveness", *Journal of the American Society for Information Science*, 47(1), (1996), 37-49.

Hawking, D., et al., "Overview of TREC-8 Web Track", *The Eighth Text Retrieval Conference (TREC 8)*, (Feb. 2000), 131-148.

Heintze, N., et al., "Scalable Document Fingerprinting (Extended Abstract)", *Proceedings of the Second USENIX Electronic Commerce Workshop*, (Nov. 1996), 191-200.

Hersh, W., et al., "OHSUMED: An Interactive Retrieval Evaluation and New Large Test Collection for Research", *Proceedings of the 17th International Conference on Research and Development in Information Retrieval (SIGIR '94)*, (Jul. 1994), 192-201.

Hoppenbrouwers, J., et al., "Invading the Fortress: How to Besiege Reinforced Information Bunkers", *IEEE Proceedings, Advances in Digital Libraries*, (May 22, 2000), 27-35.

Jones, K. S., et al., "Information Retrieval Test Collections", *Journal of Documentation*, 32(1), (Mar. 1976), 59-75.

Jones, K. S., et al., "Report on the Need for and Provision of an 'Ideal' Information Retrieval Test Collection", *British Library Research and Development Report 5266*, Computer Laboratory, University of Cambridge, (1975), 1-42.

Manber, U., "Finding Similar Files in a Large File System", *USENIX Winter 1994 Technical Conference Proceedings (USENIX '94)*, (Jan. 1994), 1-10.

Marcu, D., "The Automatic Construction of Large-Scale Corpora for Summarization Research", *Proceedings of the 22nd International Conference on Research and Development in Information Retrieval (SIGIR '99)*, (Aug. 1999), 137-144.

Miller, C., et al., "Detecting Duplicates: A Researcher's Dream Come True", *Online*, 14(4), (Jul. 1990), 27-34.

Mishra, R. K., et al., "KhojYantra: An Integrated MetaSearch Engine with Classification, Clustering and Ranking", *Database Engineering and Applications, Symposium 2000*, (Sep. 18, 2000), 122-131.

Mitchell, T. M., "Contents", *Machine Learning*, WCB/ McGraw-Hill, (1997), 9 pgs.

Moroney, M. J., *Facts from Figures*, Harmondsworth [Eng.] ; Baltimore : Penguin Books, 3rd Edition, (1956), 334-370.

Park, S. T., et al., "Analysis of Lexical Signatures for Fnding Lost or Related Documents", *Proceedings of the 25th International Conference on Research and Development in Information Retrieval (SIGIR '02)*, (Aug. 2002), 11-18.

Phelps, T. A., et al., "Robust Hyperlinks: Cheap, Everywhere, Now", *Proceedings of the 8th International Conference on Digital Documents and Electronic Publishing (DDEP '00)*, (Sep. 2000), 28-43.

Press, W. H., et al., *Numerical Recipes in C: The Art of Scientific Computing*, Cambridge University Press, New York, NY, 2nd Edition, (1992), 504-510.

Rose, T., et al., "The Reuters Corpus vol. 1—From Yesterday's News to Tomorrow's Language Resources", *Proceedings of the 3rd International Conference on Language Resources and Evaluation (LREC '02)*, (May 2002), 7 pgs.

Sanderson, M., "Duplicate Detection in the Reuters Collection", *Technical Report (TR-1997-5)*, (1997), 1-11.

Saracevic, T., "Users Lost: Reflections on the Past, Present, Future, and Limits of Information Science", *Proceedings of the 20th Annual International ACM SIGIR Conference on Research and Development in Information Retrieval (SIGIR '97)*, (Jul. 1997), 1-2.

Sheridan, P., et al., "Building a Large Multilingual Test Collection From Comparable News Documents", *Workshop on Cross-Lingual Information Retrieval (SIGIR '97)*, (Aug. 1996), 56-65.

Shrivakumar, N., et al., "Finding Near-Replicas of Documents on the Web", *Proceedings of Workshop on Web Databases (WebDB '98)*, (Mar. 1998), 204-212.

Siegel, S., et al., *Nonparametric Statistics for the Behavioral Sciences*, McGraw Hill, Boston, MA, (1988), 284-289.

Soboroff, Ian , et al., "Building a Filtering Test Collection for TREC 2002", *Proceedings of the 26th International Conference on Research and Development in Information Retrieval (SIGIR '03)*, (Jul.-Aug. 2003), 243-250.

Tenopir, C., et al., "Target & Freestyle: Dialog and Mead Join the Relevance Rank", *Online*, 18(3), (1994), 31-47.

Thompson, P., et al., "TREC-3 Ad Hoc Experiments Using the WIN System", *Proceedings of TREC-3*, (1995), 211-217.

Tonella, P., et al., "Using Keyword Extraction for Web Site Clustering", *Computer Society, Proceedings of the Ffifth IEEE International Workshop on Web Site Evolution (WSE'03)*, (Sep. 22, 2003), 41-48.

Turtle, H. R., "Inference Networks for Document Retrieval", *PhD Thesis*, Computer and Information Science Department, University of Massachusetts,(Oct. 1991), 214 pgs.

Turtle, H. , et al., "Natural Language vs. Boolean Query Evaluation: A Comparison of Retrieval Performance", *Proceedings of the 17th Annual International ACM SIGIR Conference on Research and Development in Information Retrieval (SIGIR '94)*, (Jul. 1994), 212-221.

Voorhees, E. M., "Overview of the Sixth Text REtrieval Conference (TREC-6).", *Information Processing and Management*, 36(1), (Jan. 2000), 3-35.

Voorhees, E. M., "Variations in Relevance Judgments and the Measurement of Retrieval Effectiveness", *Information Processing and Management*, 36(5), (Sep. 2000), 697-716.

Zhang, Yi , et al., "Novelty and Redundancy Detection in Adaptive Filtering", *Proceedings of the 25th Annual International ACM SIGIR Conference on Research and Development in Information Retrieval (SIGIR '02)*, (Aug. 2002), 81-88.

"Australian Application Serial No. 2005277039, Examiner Report mailed Jun. 5, 2008", 2 pgs.

Chinese Application No. 200580035487.6, Office Action Mailed Jan. 9, 2009, 15 pgs.

"European Application Serial No. 05792821.0, Office Action mailed Apr. 21, 2009", 5 pgs.

"International Application Serial No. PCT/US2005/030024, International Preliminary Report on Patentability mailed Nov. 13, 2006", 8 pgs.

"International Application Serial No. PCT/US2005/030024, International Search Report and Written Opinion mailed Dec. 16, 2005", 12 pgs.

"New Zealand Application Serial No. 553567, Examiner Report Mailed Nov. 13, 2008", 1 pgs.

Japanese Application Serial No. 2007-530061, Office Action Mailed Oct. 23, 2009, 8 pgs.

Chinese Application Serial No. 200580035487.6, Office Action Mailed Aug. 21, 2009, 6 pgs.

* cited by examiner

INFORMATION RETRIEVAL SYSTEMS WITH DUPLICATE DOCUMENT DETECTION AND PRESENTATION FUNCTIONS

RELATED APPLICATIONS

This application claims priority to U.S. Provisional Application 60/603,762 which was filed on Aug. 23, 2004, and to U.S. Provisional Application 60/623,975, which was filed on Nov. 1, 2004. Both these applications are incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright©2004, West Services, Inc.

TECHNICAL FIELD

Various embodiments of the present invention concern information-retrieval systems, such as those that provide news documents or other related content.

BACKGROUND

Companies, such as Thomson Legal & Regulatory, Inc. of St. Paul, Minn. (doing business as Thomson West), collect and store a vast spectrum of documents, including news, from all over the world, for online access in a system of databases and research tools, known as the Westlaw™ system. The Westlaw system empowers users to search over 100 million documents.

One problem recognized by the present inventors is that searches conducted against news or other databases frequently provide results that include duplicate documents—that is, documents that are completely or substantially identical to each other. The problem stems from news providers, such as Associated Press (AP), selling their news stories for re-publication to multiple publishers around the world. This in turn means that systems, such as the Westlaw system, that provide users searchable access to collections of news stories from a wide array of publishers typically present users with many duplicate copies of news stories in their search results. Unfortunately, the duplicate stories are mixed generally according to relevance with other distinct stories, leaving users to manually manage the complexities of identifying and/or filtering them.

Accordingly, the present inventors recognized a need to effectively address how information-retrieval systems, such as the Westlaw system, handle the existence of duplicate documents in their document collections, and more importantly within the search results of their users.

SUMMARY

To address this and other needs, the present inventors devised systems, methods, and software that facilitate the identification and/or grouping of duplicate documents in search results. One exemplary system includes three major components: 1) a signature generation module which generates document signatures based on length, temporal, and/or content components; 2) a duplicate detection module which uses the document signatures to identify "exact" or "fuzzy" duplicate documents; and 3) a user-interface (or presentation) module which allows users to control how duplicate documents are presented in their search results. For instance, users can select whether to exclude duplicates from their search results or to group duplicates together in the results presentation. In some embodiments, the identification and grouping ultimately streamline the process of users interpreting and accessing search results that contain duplicate documents.

DETAILED DESCRIPTION OF EXEMPLARY EMBODIMENTS

This description, which references and incorporates the above-identified Figures, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Definitions

The description includes many terms with meanings derived from their usage in the art or from their use within the context of the description. However, as a further aid, the following exemplary definitions are presented.

The term "document" refers to any addressable arrangement of machine-readable data, such as textual data.

The term "database" includes any logical arrangement of documents. In some embodiments, one or more of the databases share content with one or more other databases.

The term "duplicate" generally means any document having a substantial amount of content in common with at least one other document. Temporal, length, and/or content criteria are used to determine whether one document is a duplicate of another. In terms of content criteria, some embodiments identify a set of rarest terms or other features in each of a set of documents and deem those documents that have the same set of rarest terms in similar relative positions as "exact" duplicates. Other embodiments identify a set of rarest terms in each of the documents and deem those documents that surpass a threshold level of overlap among these sets of rarest terms as "fuzzy" duplicates.

Exemplary Information Retrieval System

Figure 1:
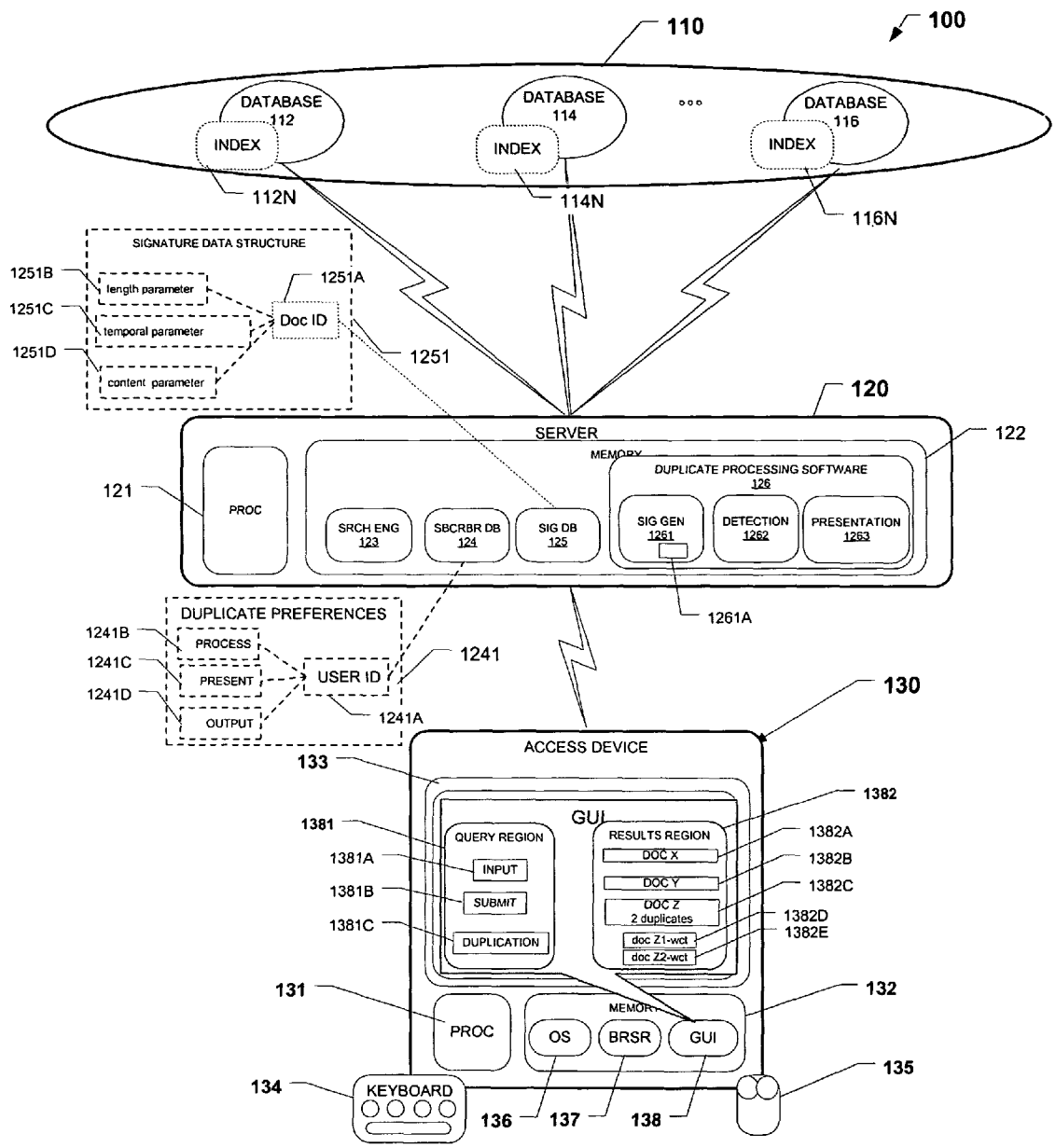
FIG. 1 is a diagram of an exemplary information-retrieval system 100 corresponding to one or more embodiments of the invention.

FIG. 1 shows an exemplary online information-retrieval system 100. System 100 includes one or more databases 110, one or more servers 120, and one or more access devices 130.

Databases 110 include representative databases 112, 114, and 116. In the exemplary embodiment, database 112 includes news stories, for example, business and finance information; database 114 includes science and technology information; and database 116 includes intellectual property information, for example U.S. and foreign patents. In some embodiments, one or more of the databases are organized in terms of financial, scientific, or health-care data.

Databases 112, 114, and 116, which take the exemplary form of one or more electronic, magnetic, or optical data-storage devices, include or are otherwise associated with respective indices 112N, 114N, and 116N. Each of the indices includes terms and phrases in association with corresponding document addresses, identifiers, and other conventional information.

Databases 112, 114, and 116 are coupled or couplable via a wireless or wireline communications network, such as a local-, wide-, private-, or virtual-private network, to server 120.

Server 120 is generally representative of one or more servers for serving data in the form of webpages or other markup language forms with associated applets, ActiveX controls, remote-invocation objects, or other related or analogous software and data structures to service clients of various "thicknesses." More particularly, server 120 includes a processor module 121, a memory module 122, a search module 123, a subscriber database 124, a signature database 125, and a duplicate-processing module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores search module 123, subscriber database 124, signature database 125, and duplicate-processing module 126.

Search module 123 includes one or more search engines and related user-interface components, for receiving and processing user queries against one or more of databases 110. In the exemplary embodiment, one or more search engines associated with search module 123 provide Boolean or natural-language search capabilities. Subscription database 124 includes subscriber-related data for controlling, administering, and managing pay-as-you-go or subscription-based access to databases 110. In the exemplary embodiment, subscriber database 124 includes one or more duplicate preference data structures, of which data structure 1241 is representative. Data structure 1241 includes a customer or user identifier portion 1241A, which is logically associated with one or more duplicate-processing preferences, such as preferences 1241B, 1241C, and 1241D. Preference 1241B includes a default value governing whether duplicate detection is enabled or disabled when searching select databases. Preference 1241C includes a default value governing whether duplicates are included when externally outputting search results, for example during printing, saving, or emailing. Preference 1241D includes a default value governing which among two or more duplicate document definitions and/or detection algorithms are used during duplicate detection. In some embodiments, an additional preference is stored to control one or more aspects of a duplicate detection or presentation function, for example, which of the longest, most recent, or most relevant of a set of duplicate documents to list first.

Signature database 125 includes one or more document signature data structures, such as a representative data structure 1251, for each document in one or more of databases 110. In the exemplary embodiment, data structure 1251 includes a document identifier field or portion 1251A that is logically associated with one or more length-related fields or portions 1251B, one or more time-related fields or portions 1251C, and/or one or more content-related portions 1251D. (As used herein, time-related fields broadly encompass time and/or date.) The structure and contents of these fields is defined by duplicate-processing module 126.

Duplicate-processing module 126 includes a signature-generation module 1261, a duplicate-detection module 1262, and a duplicate-presentation module 1263. (In some embodiments, the software modules or components thereof are distributed across multiple servers.) Signature-generation module 1261 includes one or more inverse-document-frequency (idf) tables, of which idf table 1261A is generally representative. The exemplary embodiment uses a binary-encoded idf table having approximately one million terms, with the terms selected from a one-third sampling of a combined set of relevant document collections. In the table, each idf term is associated with a corresponding three-byte (24-bit) representation of an ordinal number (or serial number), such that the idf term can be uniquely represented by its corresponding ordinal or serial number rather than actual text representations, thereby facilitating rapid processing and reducing storage requirements for the idf table. (The constant number of bytes used to represent each idf term is a function of the total terms in the table.) The exemplary idf table excludes numeric tokens, alphanumeric tokens, tokens with special characters, such as ., – \ & +; and tokens with less than three characters. However, some embodiments may elect to include these tokens. (Further description of the signature-generation, duplicate-detection, and duplicate-presentation modules and their exemplary operation is provided below with the aid of FIG. 2.)

Server 120 is communicatively coupled or couplable via a wireless or wireline communications network, such as a local-, wide-, private-, or virtual-private network, to one or more access devices, such as access device 130.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131, a memory 132, a display 133, a keyboard 134, and a graphical pointer or selector (or mouse) 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120.)

More specifically, graphical user interface 138 defines or provides one or more display regions, such as a query region 1381 and a search-results region 1382. Query region 1381 is defined in memory and upon rendering includes one or more interactive control features (elements or widgets), such as a query input region 1381A, a query submission button 1381B, and a duplicate processing selection 1381C. Search-results region 1382 is also defined in memory and upon rendering includes one or more interactive control features, such as features 1382A, 1382B, 1382C, 1382D, and 1382E, for accessing or retrieving one or more corresponding documents from one or more of databases 110 via server 120.

Each control feature includes a respective document identifier or label, such as DOC X, DOC Y, DOC Z, DOC Z1 and DOC Z2, identifying a corresponding document and associated with a corresponding link or whole or partial uniform resource locator (URL). (Some embodiments use a URL format, such as that taught in co-pending U.S. patent application Ser. No. 09/237,219, which was filed on Jan. 25, 1999 and which is incorporated herein by reference.) User selection of the control features results in retrieval and display of at least a portion of the corresponding document within a region of interface 138 (not shown in this figure.) Control features 1382D and 1382E are indented relative to control feature 1382C to indicate the status of their corresponding documents DOC Z1 and DOC Z2 as duplicates of DOC Z, the document corresponding to control feature 1362C. Control feature 1382C includes a label "2 duplicates" indicating existence of two duplicate documents. In the exemplary embodiment, each of these control features takes the form of a hyperlink or other browser-compatible command input, and provides access to and control of query region 1381 and search-results region. Although FIG. 1 shows query region 1381 and results region 1382 as being simultaneously displayed, some embodiments present them at separate times.

Exemplary Methods of Operation

Figure 2:
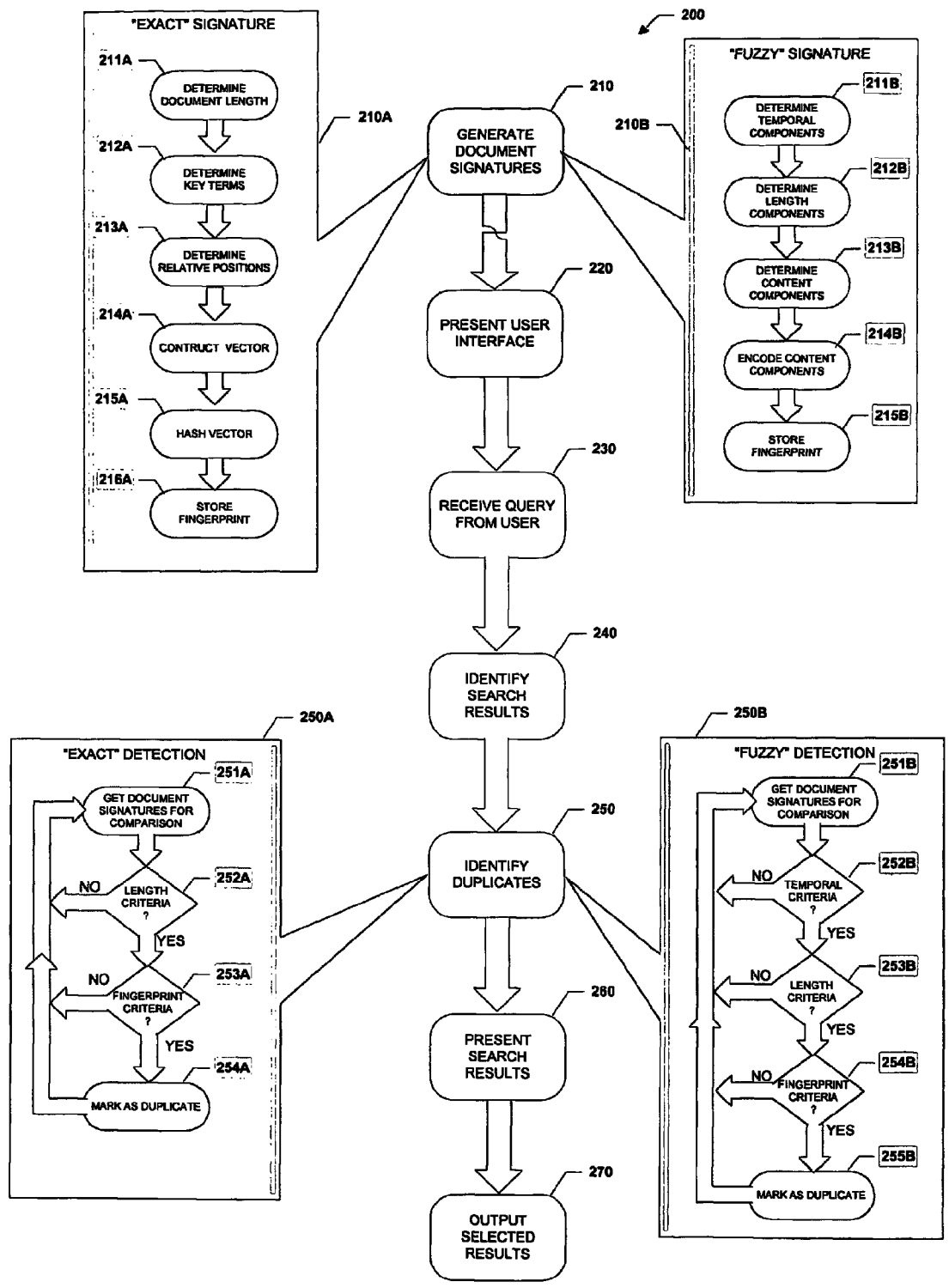
FIG. 2 is a flowchart corresponding to one or more exemplary methods of operating system 100 and one or more embodiments of the invention.

FIG. 2 shows a flow chart 200 of one or more exemplary methods of operating a system, such as system 100. Flow chart 200 includes blocks 210-270, which, like other blocks in this description, are arranged and described in a serial sequence in the exemplary embodiment. However, some embodiments execute two or more blocks in parallel using multiple processors or processor-like devices or a single processor organized as two or more virtual machines or sub processors. Some embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow (in FIG. 2 and elsewhere in this description) applies to software, hardware, and firmware implementations.

At block 210, the exemplary method begins automated generation of metadata (such as digital signatures) for one or more searchable documents of the online information-retrieval system. In the exemplary embodiment, this proceeds according to a batch process for documents in a select set of databases, such as news databases. (In some embodiments, the process is executed on a per-document, and/or real-time query-driven basis.) The batch process generally entails generating and storing, for each document, a document signature data structure. The exemplary embodiment uses one of two or more signature-generation processes generally represented by flow charts 210A and 210B. (In some embodiments, which may compute signatures in real-time, the choice of process is governed via a user preference; however in other embodiments, both processes are used to provide each document with two document signatures and user preferences are used during detection to determine which signature or detection method to use. In some embodiments, the choice of signature is an administrative decision.) Flow chart 210A shows generation of signatures that facilitate detection of duplicates according to a more exact duplicate standard, whereas flow chart 210B shows generation of signatures that facilitate detection of duplicates according to a less exact or "fuzzy" standard.

Exact Signature Generation

More particularly, flow chart 210A, which yields a signature having a length scalar and a fingerprint (for example, a hash value), includes process blocks 211A-216A. The process begins at block 211A which entails determining one or more document length features or values. To this end, the exemplary embodiment determines a length scalar, which is defined as the document length in tokens, excluding newspaper, title, author and other header information.

Next, block 212A entails determining or identifying and ranking one or more semantic or lexical (more generally, content) values for the document. In the exemplary embodiment, this entails determining a 'fingerprint' or term vector which is defined to include the top X, for example six, unique highest-ranking inverse-document-frequency (idf) terms for the document (excluding title, author, and other header information or metadata.) The idf for a given term is defined as the reciprocal of the document frequency of the term, that is, the inverse of the number of documents in the collection under consideration that contain the term. Some embodiments use a normalized IDF which is defined as $$IDF = \frac{\log\left(\frac{N+0.5}{n}\right)}{\log(N+1.0)} \quad (1)$$

where n denotes the number of documents containing the given term; N denotes the total number of documents in the collection; and the constants in the numerator and denominator serve as scaling factors where there is sparse data.

In specifically defining the vector, the exemplary embodiment excludes terms in the document title and other headings from consideration as a top idf term, because these may vary significantly in duplicate newspaper articles. Also, it excludes terms with an unusually high idf—for example terms having an idf greater than or equal to 0.8—from the top X idf terms because these tend to be textual aberrations, such as typos and misspellings. (Other embodiments may use greater or fewer numbers of terms and/or greater or lesser idf-exclusion criteria. Some embodiments may not use any idf-exclusion criteria. Some embodiments may even use phrases or combinations of terms, such as word pairs, rather than single terms or phrases in combination with single terms.) Once the content features are identified and ranked, execution continues at block 213A.

Block 213A entails determining relative positions of the idf terms within the document. The positions can be defined as absolute or relative positions. Absolute position is the position of a term relative to the first token in the document. One sample vector includes the following:

prevarication[76],
hostage[0],
conspicuous[25],
intransigence[121],
brutality[163],
theater[13]

wherein the terms are ranked and presented in descending order of idf value and the position, shown in brackets, is measured in tokens relative to a first token in the document.

Some embodiments measure position of each idf term relative to the position of the preceding highest-ranked idf term. And, some embodiments, which provide a relaxed or more tolerant definition of duplicate documents, round the relative positional offsets into bins. For instance, one embodiment rounds the positional offset for each corresponding top idf term into the closest of a series of ten-token "bins," with the number of bins determined by the size of the document in tokens divided by ten. This positional binning is effective in allowing this embodiment to handle cases where a document has been subjected to insertions or short substitutions and would still generally be regarded as a duplicate of another different, but otherwise identical document. The table below shows a sample set of six idf terms presented in descending rank order along with their original (or absolute) position within the document in the second column, their relative positions in the third column, and their binned (or rounded) relative positions in the fourth column.

| idf term (descending rank order) | Original document position | position relative to preceding ranked idf term | "binned" relative position |
|---|---|---|---|
| irate | 11 | 11 − 0 = 11 | 20 |
| flabbergasted | 35 | 35 − 11 = 24 | 30 |
| dishonorable | 62 | 62 − 35 = 27 | 30 |
| disgraceful | 67 | 67 − 62 = 5 | 10 |
| outrageous | 80 | 80 − 67 = 13 | 20 |
| ignoble | 120 | 120 − 80 = 40 | 40 |

Note that all rounding used in the positional binning is upward, and that differences ending in 0 are left untouched (for example, see binned relative position for ignoble in the table.) Also note that in this embodiment the terms present in the title of the document (and in any of the accompanying headings and subheadings) do not participate (that is, are not counted in) the generation of the offsets within the document. After defining the fingerprint, execution advances to block 214A.

Block 214A entails determining a hash value (or other unique value) based on the fingerprint. Specifically, the exemplary embodiment concatenates the top idf-terms and positional information into a single string, such as "irate20flabbergasted30dishonorable30disgraceful10outrageous20ignoble40," and then hashes the resulting string according to the algorithm to determine the hash value. In the exemplary embodiment, this entails hashing the vector into a 20-byte key using National Institute of Standards and Technology's SHA1 hashing algorithm. Some embodiments may use other methods of determining a hash value.

Block 215A entails forming or defining a document signature (that is, data structure) based on one or more of the length values and the determined fingerprint number (such as hash value based on content.) In the exemplary embodiment, this entails aggregating the scalar length value and the fingerprint number into a data structure that is logically associated with the corresponding document, for example using a document identifier or pointer.

Block 216A entails storing the document signature data structure in a memory device. To this end, the exemplary embodiment stores the data structure in an index or metadata database, such as document signature database 125 in FIG. 1.

Fuzzy Signature Generation

Flow chart 210B—which shows generation of a document signature data structure (or characteristic feature set) based on document temporal, length, and content components—includes process blocks 211B-215B.

Specifically, block 211B entails determining one or more temporal components or values for the document. In the exemplary embodiment, this determination entails extracting a publication date or time stamp from the dateline of a document, and then converting the date or time stamp to a simple integer representing the number of hours, days, weeks, or months relative to a reference date, such as Jan. 1, 1950. Other documents may use other dates associated with or contained in the document, such as a first or last occurring date in the document or a portion of the first or last occurring date. For example, some embodiments may extract and use the first occurring year in the document as a basis for the temporal component. Still others may determine a temporal component based on multiple dates within the document, for example an average or aggregate of two or more dates. Execution continues at block 212B.

Block 212B determines one or more length components or values for the document. In the exemplary embodiment the length value is based on length of the document, and is determined by extracting a document-length indicator from a predefined word-count field associated with the document. However, other embodiments independently determine a word count and use this as the length value. Execution proceeds to block 213B.

Block 213B entails determining one or more content values or features for the document. In the exemplary embodiment, this entails identifying one or more lexical features for the document and forming a 'fingerprint' or term vector. The fingerprint generally includes the top Y, for example 60, highest-ranking idf terms for the document (excluding title, author, and other header information or metadata).

More specifically, the exemplary embodiment tokenizes and parses a document into terms, and then sorts these terms by their associated idfs. Any terms that are not in the idf table plus any terms included on a list of stop words are excluded from the term (or feature) vector. If the number of idf terms y in a document is less than 10, no signature is created for the document. However, if y is between 10 and Y−1 inclusive, the exemplary embodiment pads the term vector with additional terms to ensure inclusion of Y terms.

Exemplary padding proceeds as follows. If the number of idf terms y for a document falls between 30 and 59 inclusive, the exemplary embodiment pads by adding up to 30 different alphanumeric terms to the vector, such as 'pad1', 'pad2', 'pad3', . . . , 'padn', where n=Y−y. If y is between 10 and 29 inclusive, the exemplary embodiment pads the term vector with some combination of n predetermined non-idf terms and m randomly selected non-idf terms, such that y+n+m=Y. The n predetermined non-idf-tabled terms, in some embodiments, are (as above) alphanumeric terms, such as 'pad1', 'pad2', ..., 'padn', which have a common text portion and a sequenced numeric portion. The m randomly generated non-idf-tabled terms, in some embodiments, are alphanumeric terms, R1, R2, Rm, which represent terms that are not matchable with existing idf terms. The table below illustrates the padding scheme used in the exemplary embodiment.

| # of idf terms, y | # of non-random pad terms, n | # of non-matchable terms, m |
|---|---|---|
| y >= 60 | 0 | 0 |
| 30 <= y <= 59 | pad1, pad2, ..., padn, n = Y - y | 0 |
| 28 or 29 | pad1, pad2, ..., padn, n = Y - y - 1 | 1 |
| 26 or 27 | pad1, pad2, ..., padn, n = Y - y - 2 | 2 |
| 24 or 25 | pad1, pad2, ..., padn, n = Y - y - 3 | 3 |
| 22 or 23 | pad1, pad2, ..., padn, n = Y - y - 4 | 4 |
| 20 or 21 | pad1, pad2, ..., padn, n = Y - y - 5 | 5 |
| 18 or 19 | pad1, pad2, ..., padn, n = Y - y - 6 | 6 |
| 16 or 17 | pad1, pad2, ..., padn, n = Y - y - 7 | 7 |
| 14 or 15 | pad1, pad2, ..., padn, n = Y - y - 8 | 8 |
| 12 or 13 | pad1, pad2, ..., padn, n = Y - y - 9 | 9 |
| 10 or 11 | pad1, pad2, ..., padn, n = Y - y - 10 | 10 |
| 1 <= y <= 9 | no signature created | no signature |

Next, block 214B encodes the term vector. To this end, the exemplary embodiment encodes each term separately, with the encoding based on position of the term within the ranked idf table. Specifically, the exemplary embodiment encodes each term vector token as a unique three-byte (24 bit) serial number or index that not only uniquely corresponds with the token in the idf table (which includes about one million entries), but also (in the exemplary embodiment) indicates the rank of the term in the idf table. (The exemplary embodiment organizes the terms in the vector from highest idf value to lowest to accelerate mismatch count and thus reduce computation time.) After encoding the term vector, execution advances to block 215B.

Block 215B entails storing the document signature data structure in a memory device. To this end, the exemplary embodiment stores the signature in a metadata database, such as signature database 125 (in FIG. 1). (Some embodiments append the document signature data to the document.)

Some embodiments address issues surrounding the maintenance of collection statistics and idf table updates. For example, one embodiment, which creates signatures according to flow chart 210A and/or 210B, recognizes the sensitivity of these document signatures to updates of the idf table that typically occur with addition, deletion, or correction of documents in a given collection or database. This embodiment provides a pair of signatures for those documents published close to an idf-table update date (for example, within a two-month window centered on the update date.) One signature, a pre-update signature, is based on the idf table prior to update, and the other, a post-update signature, is based on the idf table after update. (In use, for example at block 250, if at least one of the two signatures matches at least one of the signatures for another document, the two documents are regarded as duplicates.)

Figure 3:
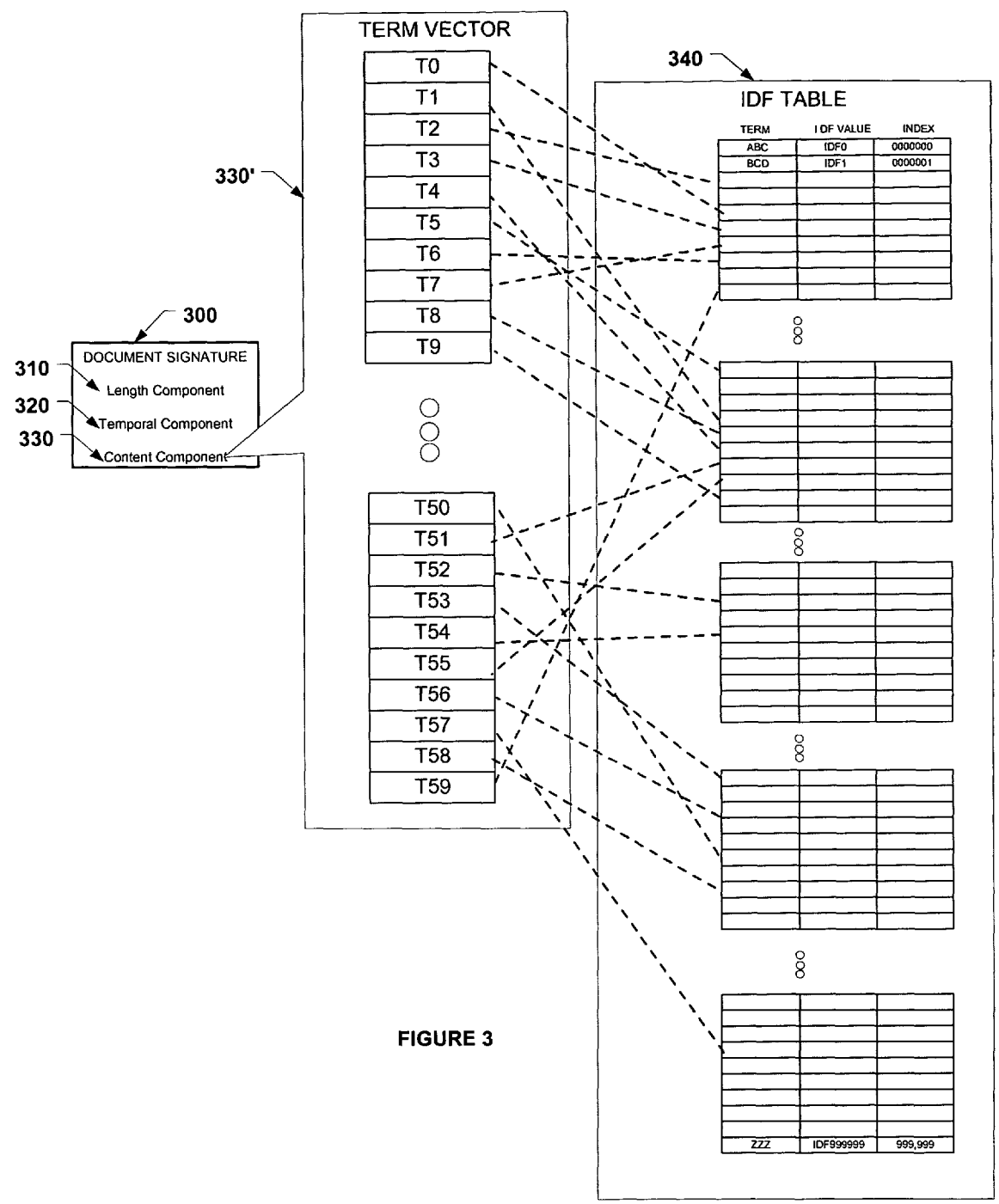
FIG. 3 is a diagram of an exemplary document signature and IDF table corresponding to one or more embodiments of the invention.

FIG. 3 shows how a document signature 300 is related to an idf table 340 via its content component 310. Specifically, document signature 300 includes a length component 310, a temporal component 320, and a content component 330. Content component 330 takes the exemplary form of a 60-term vector 330', which includes terms T0-T59. As shown in FIG. 3 one or more of the terms, for example all of the terms, map to terms in idf table 340, which has one million terms and corresponding idf values.

After generating and storing document signatures for all the documents of the select databases according to one or both of the methods shown in flow charts 210A and 210B, exemplary execution eventually proceeds to block 220.

Block 220 entails presenting a search interface to a user. In the exemplary embodiment, this entails a user directing a browser in a client access device to an internet-protocol (IP) address for an online information-retrieval system, such as the Westlaw system, and then logging onto the system. Successful login results in a web-based search interface, such as interface 138 in FIG. 1 or interface 300 in FIG. 4 (or one or more portions thereof) being output from server 120, stored in memory 132, and displayed by client access device 130.

Figure 4:
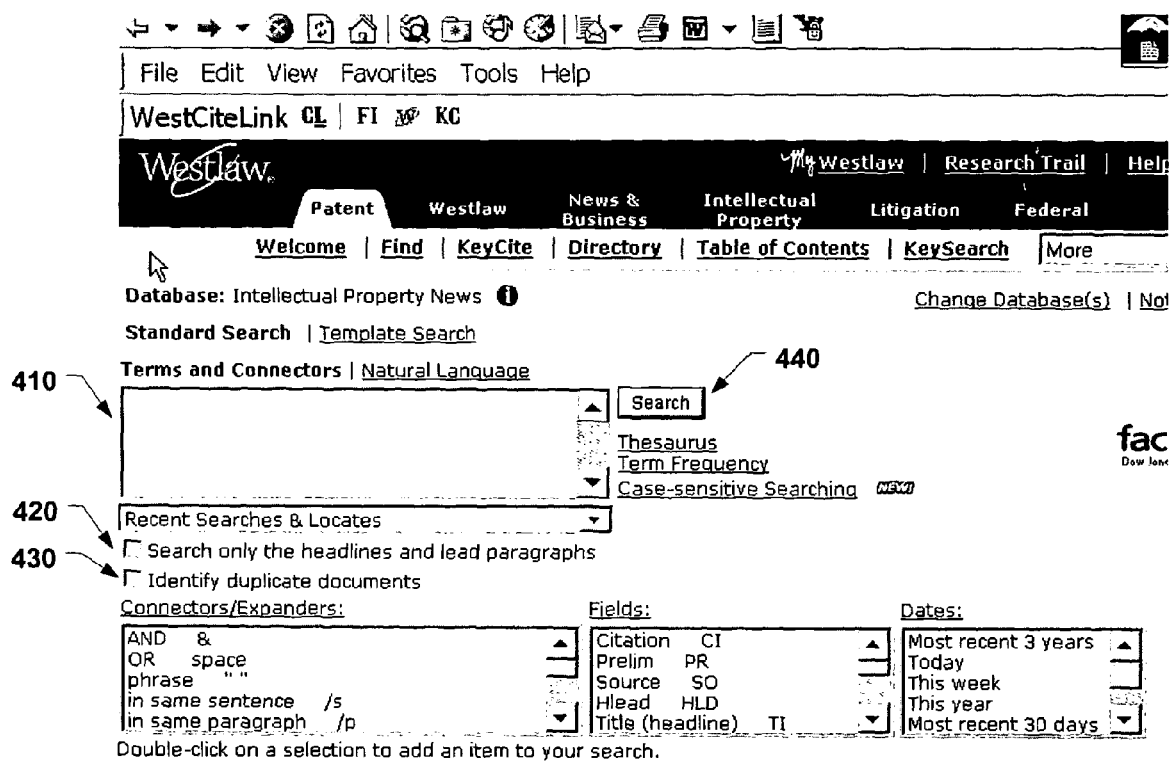
FIG. 4 is a facsimile of an exemplary query window 400 corresponding to one or more embodiments of the invention.

As FIG. 4 shows, interface 400 includes a number of interactive control features, including a query input region 410, a query field restriction region 420, a duplicate directive region 430, and a query submit command 440. Query input region 410 receives textual input defining a query. Query targeting region 420 allows the user to target the query to a specific subsection of documents, the headlines and lead paragraphs, in a fielded database. (Other embodiments may have one or more other selectable subsections.) Duplicate-directive region 430 allows the user to specifically enable identification of duplicate documents within search results for the query being defined. The initial state of this directive region is determined by a default user preference value stored in a subscriber database, such as database 124. Changing the state of the directive region, in the exemplary embodiment, changes the directive for the current query; the default preference value is unaffected unless changed at a higher control level.

Using interface 138 or 400, the user can define or submit a query and cause it to be output to a server, such as server 120. In other embodiments, a query may have been defined or selected by a user to automatically execute on a scheduled or event-driven basis. In these cases, the query may already reside in the memory of a server for the information-retrieval system (such as done for clipping services), and thus need not be communicated to the server repeatedly. Execution then advances to block 230 (in FIG. 2.)

Block 230 entails receiving a query. In the exemplary embodiment, the query includes a query string and/or a set of target databases, which includes one or more of the select databases. In some embodiments, the query string includes a set of terms and/or connectors, and in other embodiment includes a natural-language string. Also, in some embodiments, the set of target databases is defined automatically or by default based on the form of the system or search interface. Also in some embodiments, the received query may be accompanied by other information, such as information defining whether to check for duplicate documents as discussed above. In any case, execution continues at block 240.

Block 240 entails identifying a set of documents or search results based on or in response to the received query. In the exemplary embodiment, this entails the server or components under server control or command, executing the query against the targeted set of databases and identifying documents that satisfy the query criteria. Execution proceeds to block 250.

Block 250 entails identifying sets of duplicate documents in the search results. (In some embodiments, execution of the duplicate identification block is contingent on a default or selected user option that specifies whether to identify duplicate documents. Some embodiments allow users or administrators to select which of two or more duplicate-detection techniques or algorithms to use.) In the exemplary embodiment, duplicate identification generally entails comparing one or more aspects of one or more document signatures to corresponding aspects of other document signatures and determining whether documents are duplicates based on "exact" or "fuzzy" (less exact) standard of what constitutes a duplicate document.

More specifically, the exemplary embodiment follows the method shown in flow chart 250A, which includes process blocks 251A-254A for the exact or more exact detection algorithm, or the method shown in flow chart 250B, which includes process blocks 251B-255B for a "fuzzy" detection algorithm. Some embodiments which use both types of signatures described above use both corresponding methods.

Exact Duplicate Detection

In flow chart 250A, the exemplary method begins at block 251A, which entails selecting two or more documents of the search results for comparison. In the exemplary embodiment, this entails retrieving document signature data structures for each document in the search results based on their document identifiers and defining a number of document pairs for real-time duplicate detection or comparison. Defining the document pairs entails selecting a primary document and pairing the primary document (or more precisely its document signature) with each of the other documents in the search results, then selecting a second primary document and pairing it with all other documents with which it has not already been paired. Similarly, each document can be selected as a primary document and paired with all other documents with which it has not already been paired, ultimately defining a complete set of unique document pairings for comparison. (In some embodiments, the primary documents are selected in order of their relevance ranking within the search results. Also, some embodiments restrict application of the duplicate detection process to documents that exceed a certain relevance threshold or that have a certain minimum ranking.) Execution then advances to block 252A.

Block 252A entails determining whether the length criteria for the set of documents selected for comparison are satisfied. In the exemplary embodiment, this entails determining whether the length scalars of a selected pair of document signature data structures are within a predetermined range, such as ±40 tokens or ±10% of each other. The fixed or relative range allows for potential differences in documents that are near the header material, for example, Dateline: Amsterdam. If the determination is that the length criteria (or condition(s)) are not satisfied, execution returns to block 251A for selection of another set of documents for comparison. However, if the length criteria are satisfied, execution advances to block 253A.

Block 253A determines whether content criteria for the selected documents are satisfied. In the exemplary embodiment, this entails comparing the document fingerprints of the selected documents to each other. If the two fingerprints are not identical, execution returns to block 251A for selection of another set of documents for comparison. If the fingerprints are identical, execution advances to block 254A.

Block 254A entails marking the selected documents as duplicates of each other. In the exemplary embodiment, this marking entails storing the document identifiers for the documents deemed to be duplicates in a duplicate-set buffer. (In other embodiments, the marking includes adding the document identifiers for the selected documents to a master duplicate document database or to the respective document signature data structures for the selected documents, which may be reused for special duplicate-document queries.)

Execution then returns to block 251A for the selection of the next set of documents for comparison. In the exemplary embodiment, block 251A includes logic for terminating the comparison process after all selected sets of documents are processed.

Fuzzy Duplicate Detection

Flow chart 250B depicts an alternative detection process, which generally entails a real-time multilevel processing of the signature data structures for the documents identified in the search results. (Some embodiments may perform duplicate detection prior to, rather than in response to a user query.) Flow chart 250B includes process blocks 251B-255B.

At block 251B, the process ensues with retrieval of at least two document signature data structures for documents identified in the search results. In the exemplary embodiment, this entails retrieving signature data structures from signature database 125 (shown in FIG. 1) for each document in the search results in a manner similar to that described for block 251A. Once the signatures are retrieved, a set of two or more document signatures are selected for use in determining whether their corresponding documents are duplicates. Execution then continues at block 252B.

Block 252B determines whether the temporal criteria for components associated with the two or more document signatures are within a certain time period of each other. In the exemplary embodiment, this entails determining whether the temporal components of the selected document signatures are within 30 days of each other. (Some embodiments use smaller or larger temporal windows.) A negative determination results in the documents being deemed as non-duplicates and execution returning to block 251B to get another set of document signatures for comparison, whereas a positive determination extends processing to block 253B.

Block 253B determines whether the length components of the signature data structures for one or more corresponding documents are within some range of each other. In the exemplary embodiment, this entails determining in real-time whether the length components are within ±20% of each other. If the length determination is negative, the documents are considered as non-duplicates and execution returns to block 251B to select another set of document signatures for comparison. However, if the determination is positive, indicating that the document lengths are sufficiently close, execution continues at block 254B.

Block 254B entails determining whether the set of document signatures satisfy the fingerprint or content criteria for duplicate documents. In the exemplary embodiment, this entails determining whether at least 80% of the terms in the term vector for one document are contained within the term vector for the other document. Some embodiments may use alternative thresholds, for example, 60, 65, 70, 75, 80, 85, 90, or 95%. Other embodiments may use dynamic thresholds that vary based on type of documents or database; indeed some embodiments allow users to select the threshold.

More particularly, in determining whether the content criteria are met, the exemplary embodiment performs a real-time term-by-term comparison, incrementing a mismatch counter for every term mismatch and a match counter for every match. The term-by-term comparison is terminated when the mismatch counter exceeds a non-duplicate threshold, such as 12, which indicates that the content criteria cannot be satisfied (since, for example, more than 20% of the terms have not matched). Alternatively, the term-by-term comparison could terminate when the match counter meets a duplicate threshold, such as 49, which indicates that more than 80% of the terms have matched. In any event, if the content criteria are not satisfied, execution returns to block 251B. And, if the content criteria is satisfied, execution proceeds to block 255B.

Block 255B entails marking the documents in the document sets as duplicates. In the exemplary embodiment, this marking entails storing the document identifiers for the documents deemed to be duplicates in a duplicate-set buffer. After identifying duplicates within the search results, execution proceeds to block 260.

Figure 5:
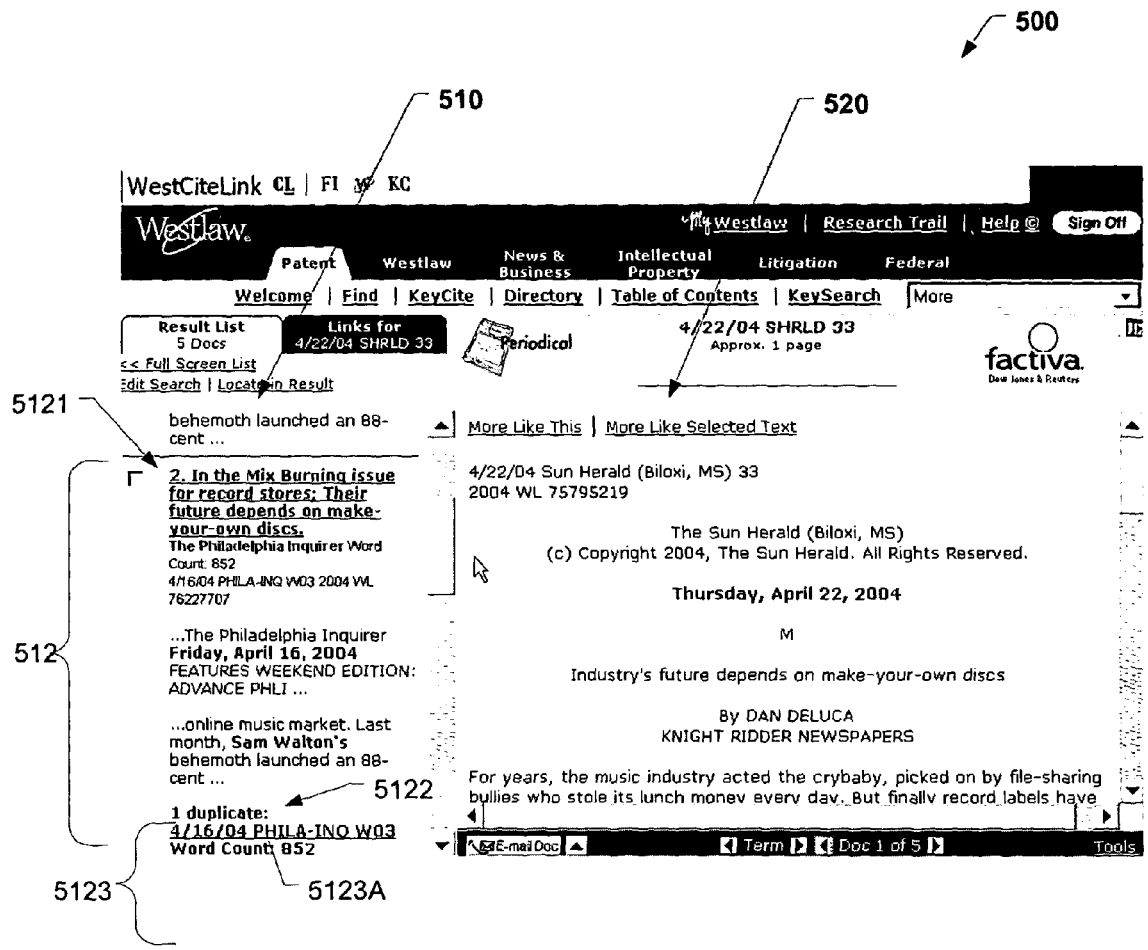
FIG. 5 is a facsimile of an exemplary user interface 500 corresponding to one or more embodiments of the invention.

Block 260 entails presenting search results to a user. In the exemplary embodiment, this entails outputting the search results in the form of a ranked list to a client access device, such as client access device 130 in FIG. 1. Specifically, the exemplary embodiment provides the list within the context of a graphical user-interface, as exemplified by interface 138, specifically region 1382 in FIG. 1 or alternatively by interface 500 in FIG. 5.

Interface 500 shows a results list 510 of selectable document citations or hyperlinks and window 520 for displaying text of at least one of the documents in results list 510. Results list 510 includes one or more sets or groupings of duplicate document identifiers or citations, of which a duplicate set 512 is representative. In the exemplary embodiment, the position of set 512 within results list 510 is determined based on reverse chronological listing, relevance rank, or score of the highest ranked document in or associated with the set. For example, if the original set includes documents 3 and 5 (in rank order) that are duplicates and document 5 is the primary document, the entire duplicate set is displayed in the number 3 position in the cite list. Set 512 includes a primary document identifier 5121, duplicate count indicator 5122, and a duplicate identifier 5123.

Primary document identifier 5121 identifies a primary document, which in the exemplary embodiment is defined as the longest of the documents in the duplicate set. If two or more duplicate documents are the same length (that is, have the same word count), then the more recent document is listed as the primary document. In some embodiments, the primary document identifier corresponds to the document having the highest relevance score or the most recent publication date.

Duplicate count indicator 5122 indicates the number of documents in the search results that are considered to be duplicates of the primary document—that is, to include substantial amounts of content that are duplicative of content of the primary document. In the example shown, the primary document is indicated to have one duplicate in the results list.

Duplicate listing 5123 lists one or more selectable document citations or identifiers, such as document citation or identifier 5123A, each associated with a document (or document URL) deemed relevant to the search query and considered to include a substantial amount of content that is duplicative of content in the primary document. (In the exemplary embodiment, duplicates are determined in accord with the techniques and principles presented herein; however, other embodiments may use alternative techniques and/or principles.) In the duplicate listing, the order of listing multiple duplicates can be determined by length, publication date, document relevance, or access frequency. In some embodiments, the labels for these links contain the date of the document, publication, and word count.

Rather than presenting the duplicate listing in the results lists, some embodiments display a container icon, such as a duplicates folder, in association with the primary document identifier. The duplicates folder is a user-selectable icon that when selected opens a window to display a listing of the duplicate documents (or corresponding URLs) along with bibliographic information.

Figure 6:
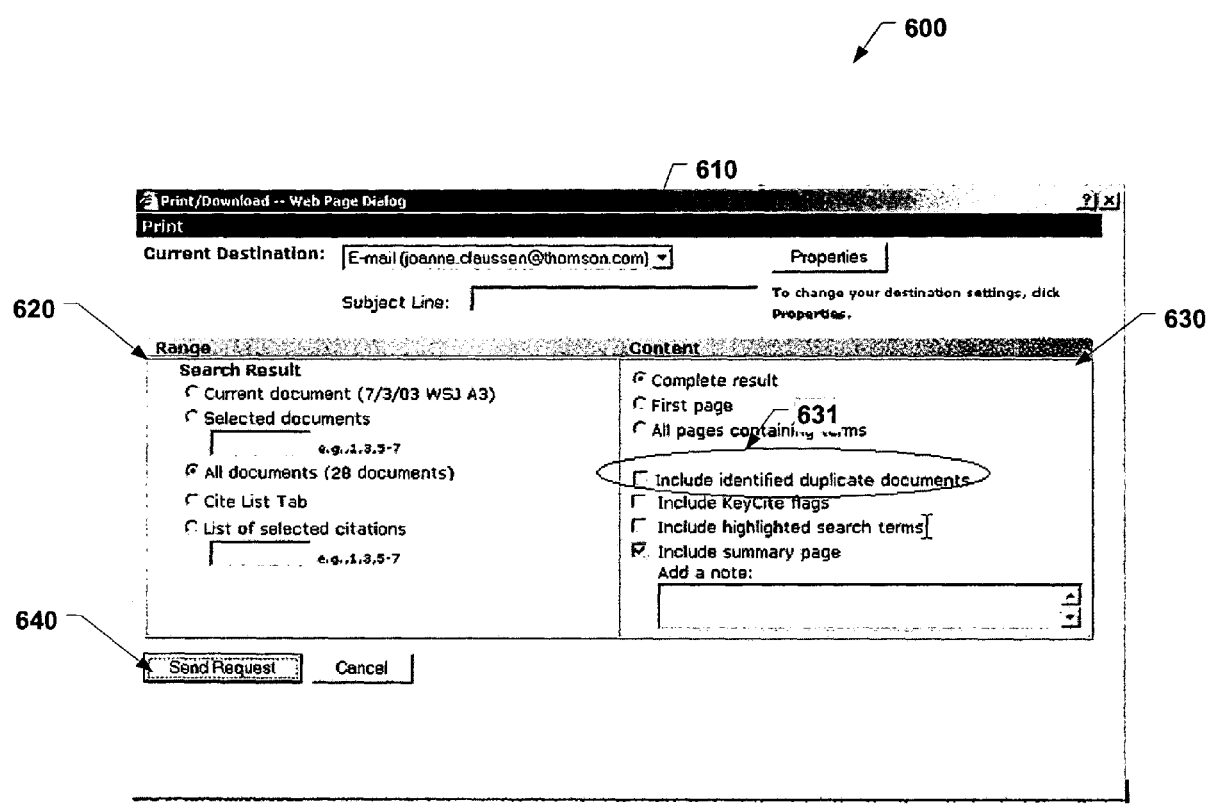
FIG. 6 is a facsimile of an exemplary user interface 600 corresponding to one or more embodiments of the invention.

From presentation of search results at block 260, execution advances to block 270, which entails outputting one or more select documents from the search results. In the exemplary embodiment, this output entails printing, emailing, or saving one or more of the identified documents to memory associated with a client access device, such as access device 130, in response to a user selection. To facilitate user control or direction of this output, the exemplary embodiment presents the user a graphical user interface, such as interface 600 in FIG. 6, which is incorporated and accessible via interface 138 in FIG. 1.

Interface 600 includes an output-destination region 610, a range-definition region 620, a content-definition region 630, and a request-submission region 640. Output-destination region 610 allows a user to specify printer, email, or memory destinations for one or more portions of the search results. (See FIG. 7 and supporting text for sample email message.) Range-definition region 620 allows a user to identify the documents within the search results that are to be output to the destination(s) identified in region 610.

Content-definition region 630, which allows the user to identify specific portions of documents selected in range-definition region 620 portion for output, includes, among other things, a duplicate-output control feature 631. This feature allows a user to indicate and control whether to include any documents that are duplicates of the identified documents as part of the output. If the user has not modified her corresponding preference, such as preference setting 1241D in subscriber database 124 of FIG. 1, the default is to exclude duplicate documents from the output, meaning that the duplicate-output control region initially indicates that duplicates are to be excluded from the output.

In the exemplary embodiment, selection or invocation of the include-duplicates feature not only causes output of duplicate documents for all options in the range definition region except for the selected documents or citations option, but also affects displays within interface 600. The "all documents" range option in region 620 includes a label indicating the number of primary documents in the search result, with the set of primary documents being the entire set of search results minus any duplicates. If the search results include 30 total documents and documents 1, 5 and 7 are duplicates, the label next to the "all documents" option in region 620 ordinarily would indicate "28 documents." However, if the user invokes the duplicate-inclusion feature (manually or by default) the label would indicate both primary and duplicate documents, or pursuant to the example, "30 documents."

Figure 7:
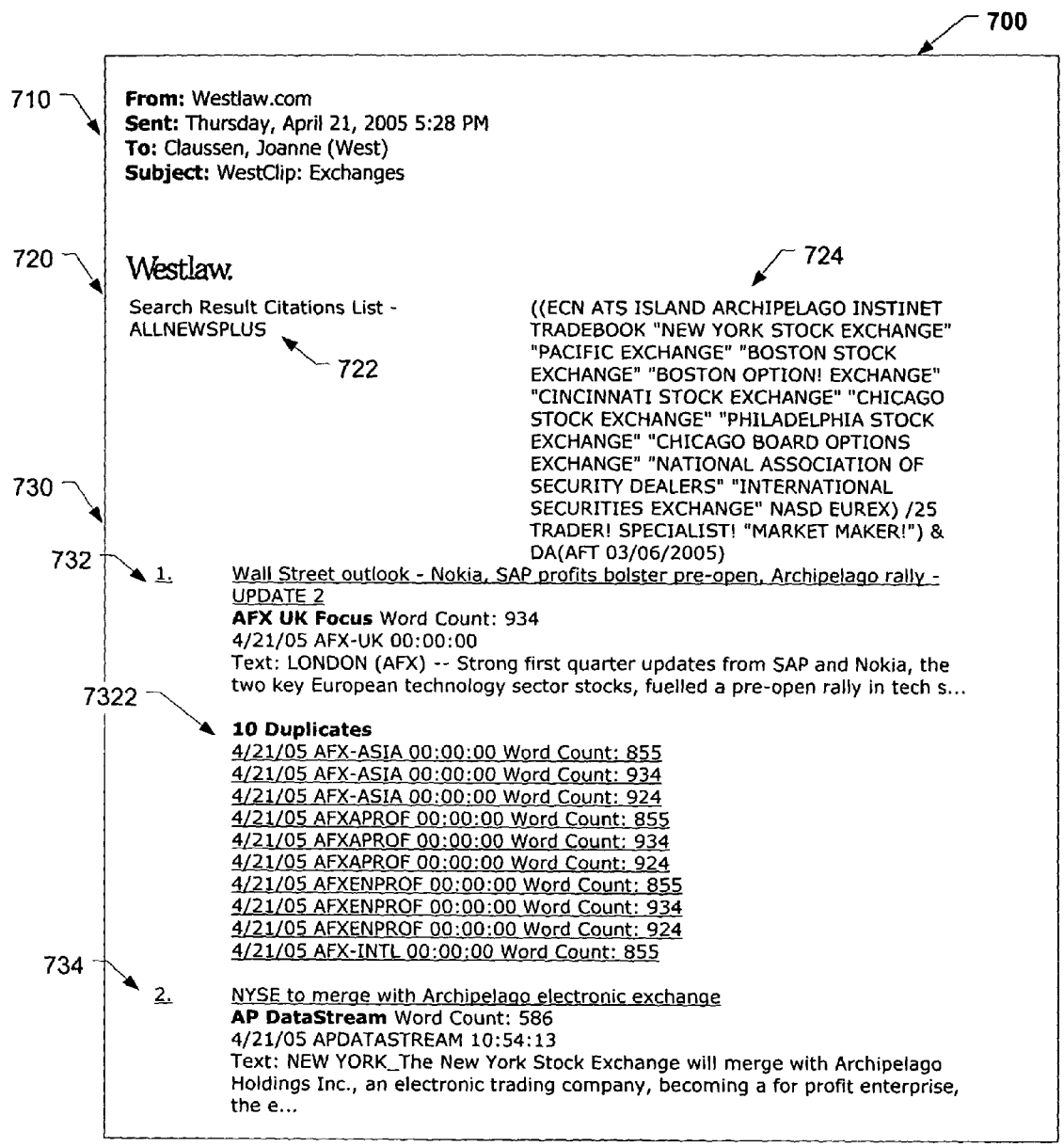
FIG. 7 is a facsimile of an exemplary HTML-formatted electronic message corresponding to one or more embodiments of the invention.

FIG. 7 shows an exemplary HTML-formatted electronic message 700 which includes among other things a results list that identifies duplicate documents. Specifically, message 700, which can also be sent in response to automatic running of a query defined for repeated, periodic or event-driven execution, includes a header 710, a query region 720, and a result listing region 730.

Header 710 includes from, sent, to, and subject regions, which respectively identify the sender, time-sent, recipient, and subject of the email. Query region 720 includes a database-identification field 722 and a query field 724. Database identification field 722 identifies the database(s) that were searched, and query field 724 lists text of a query. In the exemplary embodiment, the particular query takes the form of a Boolean or natural-language query.

Results listing region 730 includes one or more document citations or hyperlinks, such as identifiers 732 and 734, which are selectable to invoke retrieval and display of all or a portion of each corresponding document. In some embodiments, selection of one of the hyperlinks immediately causes retrieval of the corresponding document in a browser window. In others the selection results in display of a sign-on screen in the browser window, prompting the user to enter appropriate login and/or client-matter-identification data prior to document display.) Associated with document identifier 732 is a set 7322 of one or more selectable duplicate-document identifiers or links. In the exemplary embodiment, labels for these links contain respective publication date and word count.

Exemplary Options-Control Interface

Figure 8:
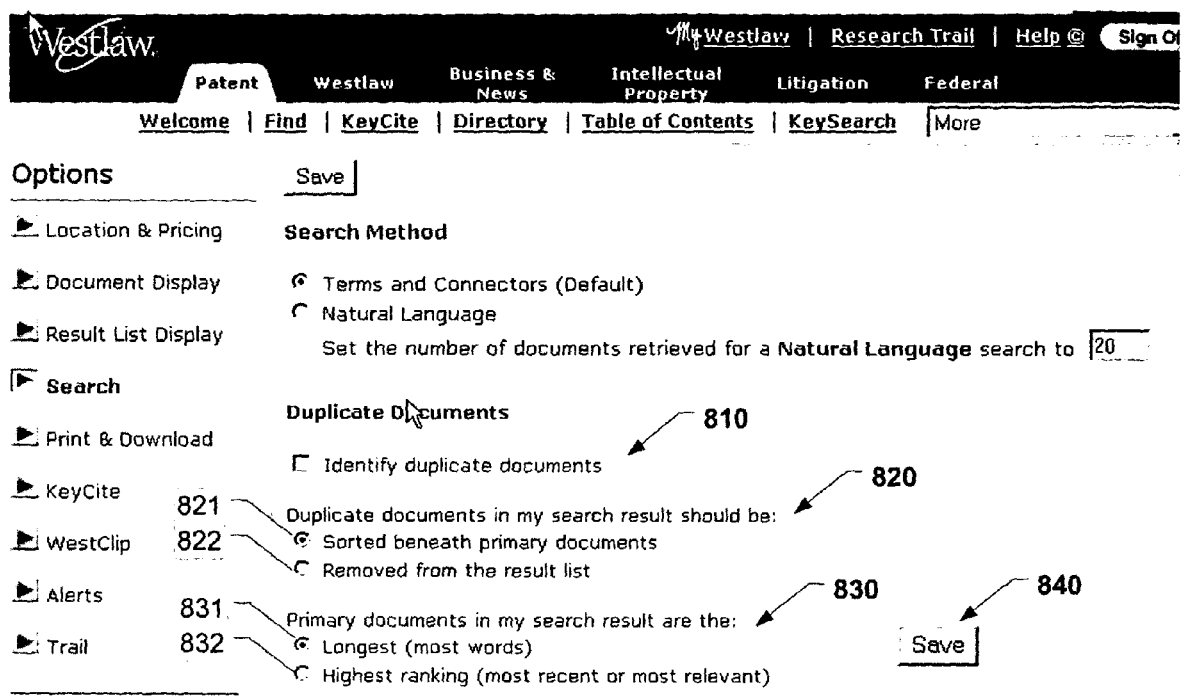
FIG. 8 is a facsimile of an exemplary user interface 800 corresponding to one or more embodiments of the invention.

FIG. 8 shows an exemplary options-control interface 800, which functions as a portion of interface 138 in FIG. 1 and allows users to set values for preferences in subscriber database 123, such as those related to duplicate processing and/or presentation. In the exemplary embodiment, interface 800 includes an identify-duplicates control feature 810, duplicate-inclusion-or-exclusion control features 820, primary-duplicate-selection features 830, and a save-command feature 840.

Identify-duplicates control feature 810, a check box in this embodiment, enables users to set the default for whether duplicate processing is performed on eligible search results.

Duplicate-inclusion-or-exclusion control elements 820 include control features 821 and 822. In this embodiment, features 821 and 822 take the form of radio buttons and respectively allow users to select whether duplicates are to be included in the displayed results list or excluded from the displayed results list.

Primary-duplicate-selection features 830 include features 831 and 832, which also take the form of radio buttons and which allow users to specify which document in a set of duplicate documents to display as a primary document in a results list. In this embodiment, the user can select to have the longest document or the most recent or most relevant document as the primary document. If duplicates are to be excluded from the search results, this option governs which document of a set of duplicates is displayed in the results list, whereas if documents are to be included within the list, this option governs which document is to be displayed first in the list.

Save command feature 840 enables a user to save changes made via control features 810, 820, 830 to subscriber database 124 for use during the remainder of a current search session and during future search sessions.

Use of Temporal and Length Bins

Some embodiments integrate the temporal and length comparison of blocks 252B and 253B (in FIG. 2) by defining sets or bins of potentially duplicate documents. For example, some embodiments retrieve a set of corresponding signature data structures as defined in flow chart 210B from signature database 124 and sort them in reverse chronological order based on their respective temporal components.

After this temporal sorting, these embodiments define one or more temporal sets or bins, by "moving" a fixed-temporal window down the sorted document list. The first temporal bin includes the first sorted document and all documents having a temporal value within a time period, such as 30 days, of the first sorted document. The second temporal bin includes the second sorted document and all documents having a temporal value within 30 days of the temporal value for the second sorted document. Additional bins are defined similarly, moving down the list of sorted documents. (Some embodiments define mutually exclusive sets or bins of documents.)

Once these temporal sets or bins are defined, these embodiments define one or more length-based bins or sets of signatures within each of the defined temporal bins. This entails sorting the signatures in each of the temporal bins in descending order of the length components in their corresponding signatures and then "moving" a length window down the sorted list to define one or more length bins or sets. The first length bin within the first temporal bin includes the first signature in the length-ranked list in that bin (that is, the longest document in the temporal bin) and all documents within the first temporal bin that are no more than 20% shorter than the length of the longest document.

In other words, each subsequent signature has a length value at least 80% of that of each other signature in the first length bin. The second length bin includes the second longest document in the first temporal bin and all documents that are no more than 20% shorter than it. Subsequent length bins are defined similarly until all the documents in each temporal bin are assigned to a length bin. Thus, two documents are members of the same length bin if their temporal features (for example, publication dates) are within the same 30-day window and the length of the shorter of the documents is no less than 80% the length of the longer document. Further length bins for the first temporal bin and any other temporal bin are defined similarly.

Figure 9:
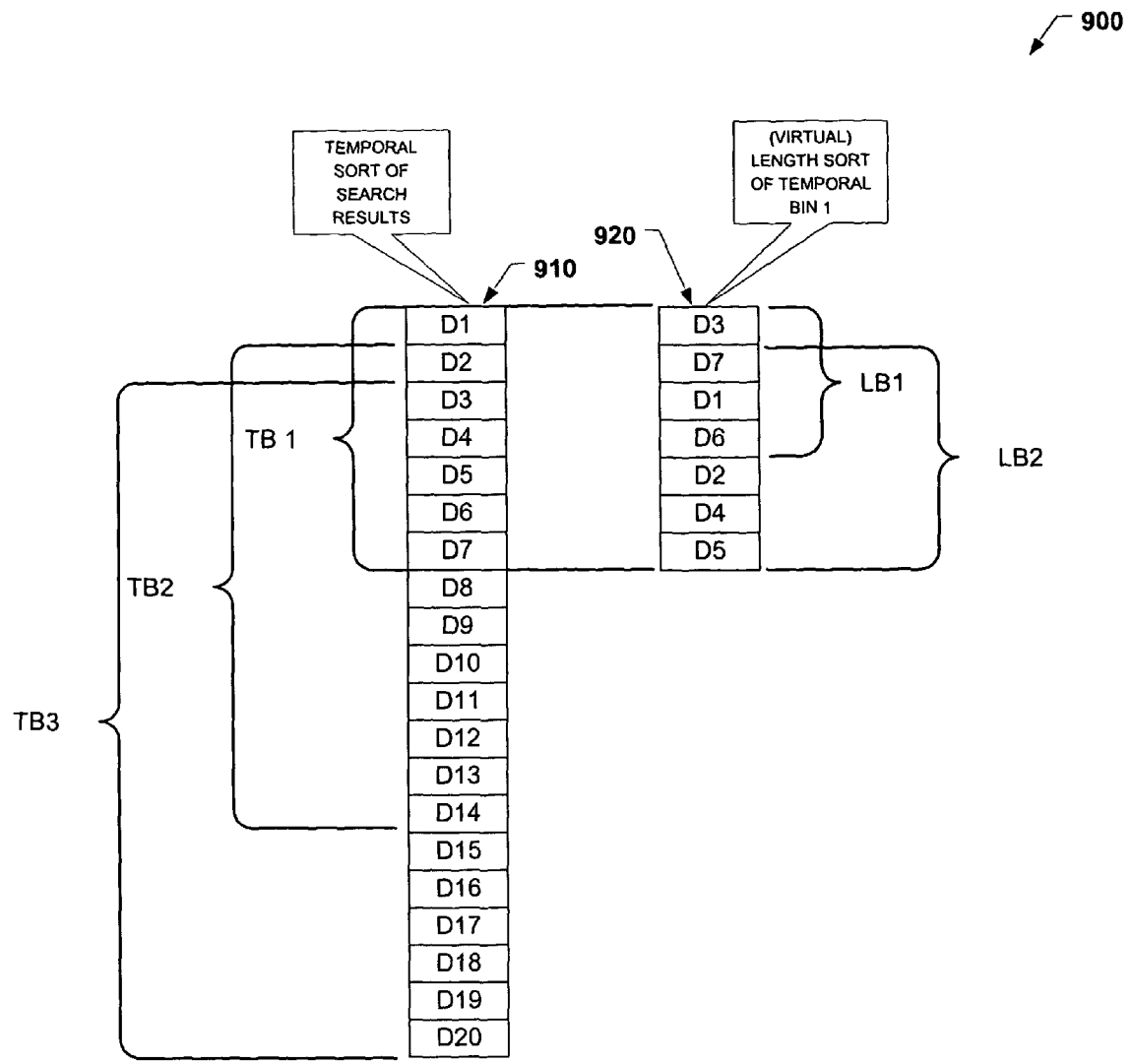
FIG. 9 is a diagram of an exemplary binning scheme that corresponds to one or more embodiments of the invention.

To illustrate this binning, FIG. 9 shows a diagram 900. Diagram 900 includes a reverse chronologically sorted list 910 of document identifiers or document signatures D1-D20, which has been organized as three temporal bins or sets TB1, TB2, and TB3, with each bin identifying or corresponding to a set of documents that are published within 30 days of each other. Temporal bin TB1 includes document identifiers or document signatures D1-D7. Sorting the contents of temporal bin TB1 based on the length components of its document signatures yields a length sorted list 920. List 920 is shown organized as two length bins LB1 and LB2, with each bin identifying or corresponding to a set of documents that are no more than 20% shorter than the length of the longest document in the bin. Once all the length bins for each temporal bin are defined, all unique pairs of documents in each length bin are compared pursuant to the content-comparison process outlined for block 254B (in FIG. 2.)

Some embodiments omit actual defining of the length bins, instead comparing the length of each document to each other document in the current temporal bin and performing the content comparison only for those pairs of documents that have lengths within ±20% of each other. In effect, these embodiments define length bins in a virtual manner.

CONCLUSION

In furtherance of the art, the present inventors have not only recognized a need to effectively address how information-retrieval systems handle the existence of duplicate documents in their document collections, but also presented herein systems, methods, and software that facilitate the identification and/or grouping of duplicate documents in search results, in accordance with user preferences. This identification and grouping ultimately streamline the process of users accessing and reviewing search results that contain duplicate documents.

The embodiments described above are intended only to illustrate and teach one or more ways of making and using the present invention, not to restrict its breadth or scope. The actual scope of the invention, which embraces all ways of practicing or implementing the teachings of the invention, is defined only by one or more issued patent claims and their equivalents.

What is claimed is:

1. An information-retrieval system comprising:
a plurality of databases; and
one or more servers for facilitating client access to the plurality of databases over a network, with the one or more servers collectively comprising:
signature-generation means for generating a plurality of document signatures, with each document signature based on a plurality of features from and their respective positions in a corresponding document in one or more of the databases, the signature-generation means comprising means for forming a document signature based on one or more of the group consisting of a document hash value and a document feature vector, wherein the hash value is based on features and positions of the features within a document;
query-definition means for defining a query and directing identification of search-result documents that include content duplicative of one or more other search-result documents;
duplicate-determination means for determining, based on a subset of the document signatures, whether one or more documents within results of the query include content duplicative of content in one or more other documents within the results;
means for controlling display of results of the query with at least one of the displayed results indicated as including content duplicative of content in one or more other documents within the results; and
means for controlling output of results of the query to a printer or email transmission device, based on user selected options related to output of documents that include content duplicative of content of one or more other documents within the results.

2. The system of claim 1, wherein the signature-generation means comprises means for determining at least two of a temporal, a length, and a content component for each document.

3. The system of claim 1, wherein each means comprises one or more sets of machine-executable instructions.

4. The system of claim 1, wherein the query-definition means for defining a query provides an option to define the query using Boolean or natural language.

5. The system of claim 1, wherein the signature-generation means for generating a plurality of document signatures comprises:
means for determining one or more document length features or values;
means for identifying a set of features from each document, based on their corresponding inverse-document-frequency (idf) values;
means for determining positions of the features in each document;
means for concatenating the set of features and their determined positions to define a string;
means for hashing the string to define a hash value for each document;
means for forming a document signature based on the document length feature or values and the hash value for each document; and
storing a document signature in a memory device.

6. The system of claim 5, wherein the signature-generation means further comprises means for rounding the determined positions of each feature; and concatenating the set of features and their rounded determined positions to define a string.

7. The system of claim 1, wherein the query-definition means for defining a query includes means for selecting an option controlling identification of search-result documents that include content duplicative of one or more other search-result documents.

8. An information-retrieval system comprising:
a plurality of databases; and
a server for providing users access to one or more of the databases, the server including:
means for defining and processing a query to generate results comprising documents that include content duplicative of content within one or more other documents within the results;
duplicate-determination means for determining whether one or more documents within the results of the query include content duplicative of content within one or more other documents within the results, wherein the duplicate-determination means includes:
means for comparing a first document signature for a first one of the documents within the results to a second document signature for a second one of the documents within the results, with each signature based on a plurality of terms and with corresponding positions within the corresponding document;
means for comparing, respectively, first and second lengths and first and second temporal features of the first and second documents;
means for comparing first and second hash values for the respective first and second documents, with each hash value based on features and positions of the features within its respective document; and
wherein the duplicate-determination means is adapted to determine whether the first and second documents are duplicates in response to the results of the means for comparing hash values;
means for controlling display of results of the query with at least one of the displayed results indicated as including content duplicative of content in one or more other documents within the results; and
means for controlling output of results of the query to a printer or email transmission device, based on user selected options related to output of documents that include content duplicative of content of one or more other documents within the results.

9. The system of claim 8, wherein each signature is based on rounded positions of the plurality of terms.

10. The system of claim 8, wherein each means comprises one or more sets of machine-executable instructions.

11. The system of claim 8, wherein the means for defining and processing a query provides an option to define the query using Boolean or natural language.

12. The system of claim 8, wherein the means for comparing first and second hash values is executed in response to the results of the means for comparing first and second lengths and respective first and second temporal features of respective first and second documents.

13. The method of claim 12, wherein the duplicate-determination means is executed in response to a query adapted for automatic future execution and in response to an automatic execution of the query.

14. The system of claim 8, wherein means for comparing first and second hash values is executed only if the length or temporal comparison is affirmative.

15. The system of claim 8, wherein the means for comparing first and second hash values further comprises:
- means for identifying a set of features from the respective document, based on their corresponding inverse-document-frequency (idf) values;
- means for determining positions of the features in the respective document;
- means for rounding the determined positions of each feature;
- means for concatenating the set of features and their rounded determined positions to define a string; and
- means for hashing the string to define the hash value.

16. A computer-implemented method of identifying whether first and second documents contain duplicate content, the method comprising:
- determining whether the first and second documents have corresponding temporal traits that are within a first range of each other;
- determining whether the first and second documents have corresponding length traits that are within a second range of each other;
- determining, in response to an affirmative determination that the temporal traits of the first and second documents are within the first range of each other and an affirmative determination that the length traits of the first and second documents are within the second range of each other, whether the first and second documents have a significant number of features in common with each other; and
- identifying the first and second documents as duplicates in response to determining that the temporal traits of the first and second documents are within the first range of each other, that the lengths of the first and second documents are within the second range of each other, and that the first and second documents have at least a significant number of features in common with each other.

17. The method of claim 16, wherein the first range is not greater than 30 days; the second range is not greater than 20%; and the significant number of features is predetermined to be at least 80 percent of a number of representative terms in each document, with the terms selected based on corresponding inverse-document-frequency values.

18. The method of claim 16, wherein the first and second documents have respective first and second document signature data structures, with each document signature data structure including:
- a temporal component based on a date of publication associated with the document;
- a length component based on a word count associated with the document; and
- a term vector based on a fixed number of (top-ranked) inverse-document frequency terms for the document.

19. The method of claim 18, wherein the term vector includes at least 10 terms.

20. A method comprising:
- determining whether respective length traits of first and second documents are within a range of each other and whether the first and second documents have at least a threshold number of selected features in common with each other, with each feature selected based on a corresponding inverse-document-frequency (idf) value, wherein determining whether the first and second documents have at least the threshold number of features in common with each other, comprises:
  - defining respective first and second term vectors for the first and second documents, with each term vector including a plurality of equal-length binary representations of idf terms for its respective document; and
  - comparing a number of the binary representations of the first term vector to a number of binary representations of the second term vector; and
- identifying the first and second documents as duplicates in response to the determination being affirmative.

21. A computer-implemented method comprising:
- receiving a user query;
- identifying at least first and second documents from a database in response to the user query, with the first and second documents associated with respective first and second feature vectors, each feature vector having a plurality of equal-length binary representations of terms or features within its respective document, with the terms or features selected based on relative magnitude of corresponding inverse-document-frequency (idf) values within a table of inverse-document-frequency values;
- determining whether temporal traits of the first and second documents are within a first range of each other;
- determining whether length traits of the first and second documents are within a second range of each other; and
- in response to identifying the first and second documents and at least one determination being affirmative, comparing the first and second feature vectors.

22. The method of claim 21, further comprising:
- presenting search results identifying at least one of the first and second documents in response to the user query, with the presented listing including an indication, based on the comparison of the first and second feature vectors, of whether the first and second documents contain content that is duplicative of each other.

23. The method of claim 22, wherein comparing the first and second feature vectors occurs in response to an affirmative determination that temporal traits of the first and second documents are within a first range of each other and an affirmative determination that length traits of the first and second documents are within a second range of each other.

24. The method of claim 21, wherein presenting search results identifying at least one of the first and second documents comprises presenting a listing of a title of the first document and wherein the indication of whether the first and second documents contain content that is duplicative of each other, includes:
- presenting a listing of a title of the second document that is below and indented relative to the title of the first document; or
- presenting a listing of a title of the second document in a font that differs from that of the title of the first document; or
- presenting a folder or other container icon which is selectable to display a listing of one or more documents that identifies the second document.

25. A computer-based system for identifying whether first and second documents contain duplicate content, the system comprising a processor, a memory, a user interface, and code executable by the processor, the system further comprising:
- means for receiving a user query;
- means for identifying at least first and second documents from a database in response to the user query, with the first and second documents associated with respective first and second feature vectors, each feature vector having a plurality of equal-length binary representations of terms or features within its respective document, with the terms or features selected based on relative magnitude of corresponding inverse-document-frequency (idf) values within a table of inverse-document-frequency values;

first determining means for determining whether temporal traits of the first and second documents are within a first range of each other;

second determining means for determining whether length traits of the first and second documents are within a second range of each other; and means for comparing the first and second feature vectors in response to having identified the first and second documents and at least one determination being affirmative.

26. The computer-based system of claim 25 further comprising a graphical user interface comprising:

a query-definition region on a display device, the region including one or more interactive control features for facilitating user definition of a query; and at least one interactive control feature, within the query-definition region, for enabling a user to select whether search results provided in response to the query are to identify documents determined to have substantial duplicate content.

27. The computer-based system of claim 26, wherein the one interactive control feature comprises a check box.

28. The computer-based system of claim 26, further comprising at least one interactive control feature for controlling output of documents determined to have substantial duplicate content with other documents in the search results.

29. The computer-based system of claim 26, further comprising a query-results region including:

one or more interactive control features for invoking display of corresponding search-result documents; and at least one interactive control feature for identifying and invoking display of a search-result document deemed to be a duplicate of at least another of the search-result documents.

30. The computer-based system of claim 25 further comprising a graphical user interface displayed on a display device, the interface comprising:

one or more interactive control features for submitting a query; and a query results region displaying search results on the display device based on the query, the region including:

at least one interactive control feature for identifying and invoking display or retrieval of a corresponding search-result document;

at least one duplicate-indication feature for indicating whether the search results include any documents that are deemed to be duplicative of the corresponding search-result document; and a duplicate count indicator for indicating a number of documents that are deemed to be duplicative.

31. The computer-based system of claim 30, wherein the one duplicate-indication feature comprises a selectable link that is positioned below and indented relative to the one interactive control feature for the corresponding search-result document.

32. The computer-based system of claim 30, further comprising at least one interactive control feature for defining a default setting of whether search results presented in response to a query identify documents determined to have substantial duplicate content.

33. The computer-based system of claim 32, wherein the one interactive control feature comprises a check box.

34. An information-retrieval system comprising:

a plurality of databases; and a server for providing users access to one or more of the databases, the server including:

means for defining and processing a query to generate results comprising documents that include content duplicative of content within one or more other documents within the results;

duplicate-determination means for determining whether one or more documents within the results of the query include content duplicative of content within one or more other documents within the results, wherein the duplicate-determination means includes:

first means for comparing a first document signature for a first one of the documents within the results to a second document signature for a second one of the documents within the results, with each signature based on a plurality of terms and their corresponding positions within its corresponding document;

second means for comparing, respectively, first and second lengths and first and second temporal features of the first and second documents; and third means for comparing a set of features common to the first and second documents, the set of features comprising features selected based on a corresponding inverse-document-frequency (idf) value, wherein the first and second documents have at least a threshold number of features in common with each other;

wherein the duplicate-determination means is adapted to determine whether the first and second documents are duplicates in response to the results of the third comparing means;

means for controlling display of results of the query with at least one of the displayed results indicated as including content duplicative of content in one or more other documents within the results; and means for controlling output of results of the query to a printer or email transmission device, based on user selected options related to output of documents that include content duplicative of content of one or more other documents within the results.

35. The system of claim 34, wherein the means for comparing a set of features is executed in response to the results of the means for comparing first and second lengths and respective first and second temporal features of respective first and second documents.

36. A method comprising:

determining whether temporal values respectively associated with first and second documents are within a range of each other and whether the first and second documents have at least a threshold number of selected features in common with each other, with each feature selected based on a corresponding inverse-document-frequency (idf) value, wherein determining whether the first and second documents have at least the threshold number of features in common with each other, comprises:

defining respective first and second term vectors for the first and second documents, with each term vector including a plurality of equal-length binary representations of idf terms for its respective document; and comparing a number of the binary representations of the first term vector to a number of binary representations of the second term vector; and identifying the first and second documents as duplicates in response to the determination being affirmative.

37. A computer-based system for identifying whether first and second documents contain duplicate content, the system comprising a processor, a memory, a user interface, and code executable by the processor, the system further comprising:

first determining means for determining whether the first and second documents have corresponding temporal traits that are within a first range of each other;

second determining means for determining whether the first and second documents have corresponding length traits that are within a second range of each other;

third determining means for determining, in response to an affirmative determination that the temporal traits of the first and second documents are within the first range of each other and an affirmative determination that the length traits of the first and second documents are within the second range of each other, whether the first and second documents have a significant number of features in common with each other; and identifying means for identifying the first and second documents as duplicates in response to determining that the temporal traits of the first and second documents are within the first range of each other, that the lengths of the first and second documents are within the second range of each other, and that the first and second documents have at least a significant number of features in common with each other.

38. A computer-based system for identifying whether first and second documents contain duplicate content, the system comprising a processor, a memory, a user interface, and code executable by the processor, the system further comprising:

means for determining whether respective length traits of first and second documents are within a range of each other and whether the first and second documents have at least a threshold number of selected features in common with each other, with each feature selected based on a corresponding inverse-document-frequency (idf) value;

means for defining respective first and second term vectors for the first and second documents, with each term vector including a plurality of equal-length binary representations of idf terms for its respective document;

means for comparing a number of the binary representations of the first term vector to a number of binary representations of the second term vector; and means for identifying the first and second documents as duplicates in response to the determination being affirmative.

39. A computer-based system for identifying whether first and second documents contain duplicate content, the system comprising a processor, a memory, a user interface, and code executable by the processor, the system further comprising:

means for determining whether temporal values respectively associated with first and second documents are within a range of each other and whether the first and second documents have at least a threshold number of selected features in common with each other, with each feature selected based on a corresponding inverse-document-frequency (idf) value;

means for defining respective first and second term vectors for the first and second documents, with each term vector including a plurality of equal-length binary representations of idf terms for its respective document;

means for comparing a number of the binary representations of the first term vector to a number of binary representations of the second term vector; and means for identifying the first and second documents as duplicates in response to the determination being affirmative.

\* \* \* \* \*